United States Patent [19]

Schinkel et al.

[11] Patent Number: 4,830,918

[45] Date of Patent: May 16, 1989

[54] HEAT-SEALABLE, STRETCHED COMPOSITE FLIMS

[75] Inventors: Ingo Schinkel; Rudi Klein, both of Walsrode, Fed. Rep. of Germany

[73] Assignee: Wolff Walsrode Aktiengesellschaft, Walsrode, Fed. Rep. of Germany

[21] Appl. No.: 34,809

[22] Filed: Apr. 3, 1987

[30] Foreign Application Priority Data

Apr. 11, 1986 [DE] Fed. Rep. of Germany ....... 3612160

[51] Int. Cl.⁴ ............................................. B32B 27/00
[52] U.S. Cl. .................................... 428/349; 428/353; 428/424.4; 428/910
[58] Field of Search ..................... 428/349, 353, 424.4, 428/910

[56] References Cited

U.S. PATENT DOCUMENTS

| | | | |
|---|---|---|---|
| 3,023,126 | 2/1962 | Underwood et al. | 428/424.2 |
| 4,119,267 | 10/1978 | Kydonieus | 29/53 |
| 4,564,559 | 1/1986 | Wagner et al. | 428/349 |
| 4,612,249 | 9/1986 | Packer et al. | 428/424.4 |

FOREIGN PATENT DOCUMENTS

| | | | |
|---|---|---|---|
| 5103955 | 8/1980 | Japan | 428/424.4 |
| 2048903 | 12/1980 | United Kingdom . | |

*Primary Examiner*—Edith Buffalow
*Attorney, Agent, or Firm*—Sprung Horn Kramer & Woods

[57] ABSTRACT

Heat-sealable composite films, stretched at least uniaxially, comprising a base layer, of a propylene polymer, which is provided on at least one of its surfaces with an adhesion promoter layer and a heat-sealable layer of a thermoplastic polyurethane elastomer.

4 Claims, No Drawings

HEAT-SEALABLE, STRETCHED COMPOSITE FLIMS

The present invention relates to heat-sealable, stretched composite films comprising a base layer, of propylene polymer, which is provided on at least one surface with a heat-sealable layer, of a thermoplastic polyurethane, which is bonded via an adhesion promoter layer, and which films are excellently suited as packaging material.

The production of heat-sealable, oriented composite films from polyolefins and polyurethanes is not yet known. Although the production of multilayer films, but not composite films, from polyolefins and polyurethanes with the aid of film blowing is described in German Patent Specification No. 2,311,365, a separating layer of a thermoplastic polyolefin is coextruded wholly in order to avoid heat bonding with the polyurethane film, and this separating layer is removed again at the latest before the processing of the polyurethane film, with which it is only loosely bonded.

No stimulation could thus be obtained from this teaching for the preparation of composite films, of propylene polymers and thermoplastic polyurethane elastomers, which, as a result of their appearance and heat-sealing in low temperatures, are excellently suited as packaging material.

The invention thus relates to heat-sealable composite films stretched at least uniaxially, comprising a base layer, of a propylene polymer, which is provided on at least one surface with a heat-sealable layer, of a thermoplastic polyurethane elastomer, which is bonded via an adhesion promotor layer.

The other surface of the base layer may preferably also have a combination of an adhesion promoter layer and an external heat-sealable layer of a thermoplastic polyurethane elastomer. Both surfaces of the base layer are preferably then provided with an identical combination. Instead of this, however, the second surface of the base layer may, if appropriate, alternatively be provided with a heat-sealable layer of a known heat-sealing material, such as, for example an α-olefin, preferably a polyethylene or a propylene-ethylene copolymer, or with a mixture of the polymers mentioned.

Preferably, the base layer of the heat-sealable composite films according to the invention comprises a propylene polymer which contains a maximum of 10% by weight of a further α-olefin having a maximum of 8 C atoms, preferably ethylene. An isotactic polypropylene having a density of 0.9 to 0.91 g/cm$^3$ and a melt flow index of 1-4 g/cm at 230° C./21.6 N (according to DIN 53 735) is preferably used.

At least one external layer of the composite films according to the invention is built up from at least one thermoplastic polyurethane elastomer, preferably from a mainly linear thermoplastic polyurethane elastomer whose polyol component is a polyester or polyether and which has a Shore hardness of preferably 75-95 A, particularly preferably 85-95 A. Corresponding thermoplastic polyurethane elastomers are described in Vieweg, "Kunststoffhandbuch" [Plastics Handbook], Volume VII, "Polyurethane" [Polyurethanes], 1966, pages 287 ff. and 1983, pages 428 ff.

Copolymers of ethylene with a simple α,β-unsaturated mono- or dicarboxylic acid are preferably suitable for the production of the adhesion promoter layer. These are particularly copolymers of ethylene and acrylic acid and, if appropriate, acrylic acid derivatives, such as acrylonitrile or acrylates, whose ester component comprises $C_1$–$C_4$. The copolymers preferably contain 1 to 20% by weight of acrylic acid and, if appropriate, acrylic acid derivatives, particularly 3 to 12% by weight of acrylic acid or acrylic acid derivatives. Copolymers having 6 to 9% by weight of acrylic acid and alkyl acrylates, such as ethyl acrylate, are particularly preferably employed. The copolymers of ethylene and at least one α,β-unsaturated dicarboxylic acid or derivatives thereof, such as maleic acid, fumaric acid or itaconic acid, or the anhydrides, esters or amides thereof, or polyolefins which contain, grafted on, the unsaturated carboxylic acids mentioned, are likewise suitable. Furthermore suitable are also copolymers of ethylene with vinyl acetate which preferably contain 2 to 33% by weight of vinyl acetate, particularly 14 to 28% by weight of vinyl acetate, and which may be saponified, if appropriate. The melt flow index of these copolymers should be in the range from 2 to 9, preferably 3 to 7 g/10 minutes at 190° C./21.6 N, measured according to DIN 53 735. It is also possible to produce the adhesion promoter layers from mixtures of the polymers mentioned, particularly from mixtures of the polyolefins and modified polyolefins mentioned.

If the other surface of the base layer is not provided with an adhesion promoter layer and an external heat-sealable layer of a thermoplastic polyurethane elastomer, this surface can, if appropriate, have a heat-sealable layer of known heat-sealing materials, such as, for example, high density polyethylene or random ethylene-propylene copolymers, having at least 4% by weight of ethylene. The density of the heat-sealable layer polymers should preferably be in the range from 0.895 to 0.960 g/cm$^3$ and their melt flow index should be in the range from 1 to 7 g/10 minutes at 190° C./21.6 N, measured according to DIN 53 735.

The composite films according to the invention may contain, in at least one of their layers, the known additives, such as antistatic agents, lubricants and antiblocking agents in the conventional quantities.

The composite films according to the invention are produced by conventional processes such as lamination, coating or (co)extrusion.

The composite films according to the invention are oriented at least uniaxially, but are preferably subjected to biaxial stretching. During the latter, a ratio of 5:1 to 9:1 should be maintained during the longitudinal stretching and a ratio of 7:1 to 10:1 during the transversal stretching.

In the composite films according to the invention, the base film of propylene polymer preferably has a thickness of 15 to 80 μm, the heat-sealable layer of polyurethane preferably has a thickness of 0.5 to 8 μm, particularly preferably 1 to 3 μm, the adhesion promoter layer lying between them has a thickness of 0.3 to 0.8 μm, particularly preferably 0.4 to 0.6 μm, and the further heat-sealable layer located, if appropriate, on the other surface of the base layer has a thickness of 0.5 to 1.5 μm, particularly preferably about 1 μm.

Since the composite films according to the invention have not only a good appearance but also a good abrasion resistance and great adhesion (non-slip properties) and have an improved tear propagation resistance compared to the known multilayer films based on propylene polymers, they are excellently suited as packaging films, particularly where non-slip stacking of the packed materials is necessary, and also for packaging goods where the packaging material is subjected to high mechanical load and must therefore have a high abrasion resistance and an improved tear propagation resistance.

The tear propagation resistance is determined according to DIN 53 363 in the examples below. The seal stretch is taken to mean the force which is necessary in order to separate a heat-sealed seam prepared under defined conditions (50 N/cm², 0.5 second, smooth sealing instrument and the sealing temperatures specified in Table 1. The seal strength is specified in Newtons (N) and is based on a 15 mm broad test strip.

EXAMPLE 1

An adhesion promoter layer of an acrylic acid/ethyl acrylate copolymer having an acrylic acid content of 9% by weight, a density of 0.940 g/cm³ and a melt flow index of 10 g/minute at 190° C./21.6 N is applied to one surface of the base film of polypropylene having a density of 0.905 g/cm³, a melt flow index of 3.3 g/10 minutes at 230° C./21.6 N and the melting range from 160°–166° C., and a heat-sealable external layer of a thermoplastic polyurethane elastomer, based on polyester, having a Shore hardness of 93 A (DIN 53 505) and a density of 1.19 g/cm³ (DIN 53 479) is applied to the adhesion promoter layer, and a layer of a random ethylene/propylene copolymer containing 4.5% by weight of ethylene, having a density of 0.90 g/cm³ and a melt flow index of 5 g/10 minutes at 230° C./21.6 N is applied to the other surface of the base layer, all the layers being applied by conventional processes, and the film is stretched in a known fashion so that a composite film is obtained which is stretched in the longitudinal direction in the ratio 5:1 and in the transverse direction in the ratio 10:1. In the resulting composite film, the base film has a thickness of 15.9 μm, the polyurethane layer a thickness of 2 μm, the adhesion promoter layer lying under the latter has a thickness of 0.6 μm, and the ethylene/propylene copolymer layer has a thickness of 1.1 μm. The individual layers of the composite film cannot be separated mechanically. The properties of the composite film are listed in Table 1.

EXAMPLE 2 (comparison)

A composite film is produced as specified in Example 1, but both surfaces of the base film of polypropylene are provided with a heat-sealable layer of ethylene/propylene copolymer layer. The polymers used have the properties specified in the example.

The measurement results are entered in Table 1.

| | Example 1 | Example 2 (comparison) |
|---|---|---|
| Film structure: | E/P copolymer | E/P copolymer |
| | PP | PP |
| | AEA | E/P copolymer |
| | PU | |
| Tear propagation resistance N/mm DIN 53 363 | | |
| longitudinal | 21.6 | 15.0 |
| transverse | 12.5 | 8.0 |
| Seal strength N/15 mm | PU layer against | E/P copolymer against |
| | PU layer | E/P copolymer |
| at sealing temperature, °C. | | |
| 85 | 0.96 | — |
| 90 | 1.81 | — |
| 100 | 2.59 | — |
| 110 | 3.30 | — |
| 120 | 3.14 | 2.0 |
| 130 | 2.38 | 2.6 |

E/P copolymer = ethylene/propylene copolymer containing 4.5% by weight of E
AEA = acrylic acid/ethyl acrylate copolymer
PP = polypropylene
PU = polyurethane

We claim:

1. A heat-sealable composite film formed of an extruded propylene polymer base layer, an adhesion promoter layer on one surface of the base layer and a heat-sealable thermoplastic polyurethane elastomer layer on the adhesion promoter layer, the film having been stretched at least uniaxially.

2. A composite film according to claim 1, including an extruded adhesion promoter layer and heat-sealable thermoplastic polyurethane elastomer layer on both surfaces of the base layer.

3. A composite film according to claim 1, further including an extruded heat-sealable layer of alphaolefin on the other surface of the base layer;

4. A composite film according to claim 1, the film having been biaxially stretched.

* * * * *